Aug. 31, 1926.
F. J. PETRICK
1,598,007
TRIPOD
Filed Sept. 21, 1923
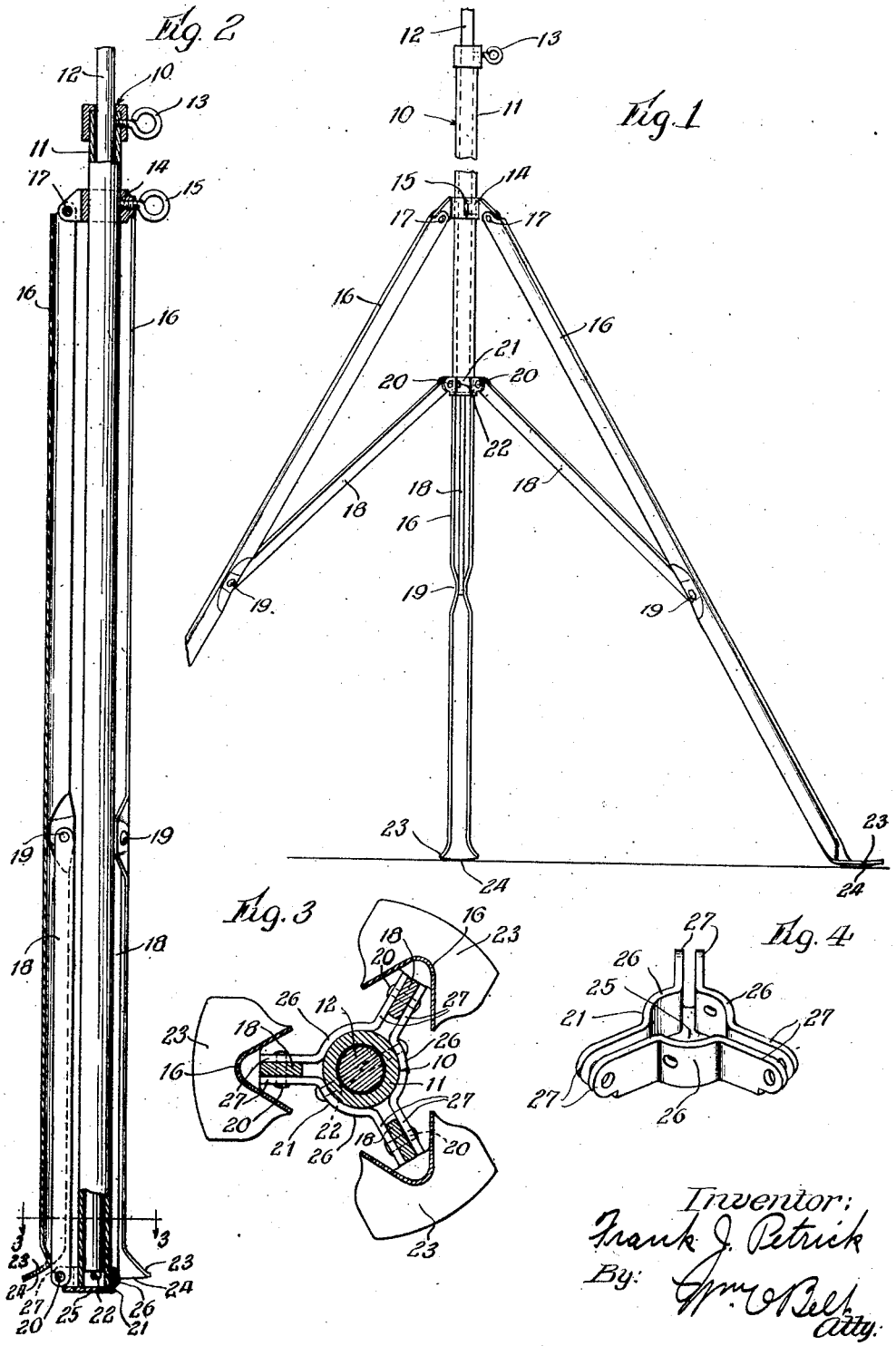
Inventor:
Frank J. Petrick
By:

Patented Aug. 31, 1926.

1,598,007

UNITED STATES PATENT OFFICE.

FRANK J. PETRICK, OF CHICAGO, ILLINOIS.

TRIPOD.

Application filed September 21, 1923. Serial No. 663,972.

The main object of this invention is to provide improved construction for a collapsible tripod of the type usually employed as supports for cameras and the like.

A more specific object of my invention is to provide a collapsible tripod of improved construction which has legs adapted to be easily and quickly brought into desired positions while the tripod is in use without accompanying marring or scratching of the surface upon which the tripod rests.

Another specific object of my invention is to provide a tripod having improved means for pivotally securing the legs of the tripod to the body thereof.

As these and other objects of my invention can be understood best from a description of a device embodying the invention, I will proceed at once with the detailed description of the specific embodiment of my invention illustrated in the accompanying drawing, wherein Fig. 1 is an elevation of my improved tripod, the tripod being shown in an extended condition or adapted to support a camera and the like.

Fig. 2 is an elevation of the tripod shown in Fig. 1, the tripod being shown, in this instance, in a collapsed condition and certain parts thereof being broken away for the purposes of better illustration.

Fig. 3 is a section taken on line 3—3 of Fig. 2, and

Fig. 4 is a perspective of a certain detail which forms a part of my improved tripod.

In the drawing, the reference character 10 designates, in its entirety, the body of my improved tripod, the body comprising a tubular socket 11 having a post 12 slidably mounted therein. The post 12 is adapted to receive the usual head (not shown) for supporting a camera or the like and may be secured in a plurality of adjusted positions relative to the tubular socket 11 by means of a set screw 13 making screw threaded engagement with the tubular socket. A collar 14 is slidably mounted upon the tubular socket 11 and is adapted to be secured in a plurality of adjusted positions relative to the tubular socket by a set screw 15. The collar 14 provides means for pivotally securing the legs 16 of the tripod to the body of the tripod, each of the legs 16 being pivotally secured to the collar 14 by a pin 17. A brace 18 is provided for each of the legs 16, each brace 18 having one of its ends pivotally secured to its associated leg by a pin 19 and having the other of its ends pivotally secured to the body 10 by a pin 20 carried in a cap 21 rigidly secured to the lower end of the tubular socket 11 by a rivet 22. It will be noted that the cap 21 closes the opening in the lower end of the tubular socket 11, thus improving the appearance of the tripod and preventing foreign matter from entering the socket to hinder the operator when the tripod is being brought into an adjusted position.

It is apparent that the tripod may be brought into and locked in the extended adjusted position shown in Fig. 1, and that it may be collapsed so that the several parts thereof will occupy positions relative to each other as shown in Fig. 2. This collapsible feature of my improved tripod is well known to those skilled in the art and no claim is made therefor, my invention having to do with the improved construction of the several parts of the tripod.

An important feature of my invention is the construction of the legs 16. Each leg 16 is formed of a single strip of sheet metal which is folded lengthwise of itself to give a leg having a substantially V-shaped cross section best shown in Fig. 3. This construction lends rigidity to the legs while permitting comparatively thin metal to be employed in the manufacture thereof and at the same time grooves are provided in the legs for receiving the braces 18 when the tripod is collapsed.

Another important feature of my invention is the means I have provided for permitting the legs to be brought into adjusted positions while the tripod is in use without accompanying marring or scratching of the surface upon which the tripod rests. It will be noted that each of the legs 16 has its end flattened out to form a foot 23 integral therewith and provided with a relatively large convex supporting surface 24. It will be readily understood that the feet 23 of the legs 16 may be brought into adjusted positions upon a varnished floor or the like without injury to the finish thereof. This construction is advantageous also for outdoor work as the legs of the tripod may be moved about with little effort or ease on the part of the operator.

The aforementioned cap 21 is also an important feature of my invention. The cap 21 is formed preferably from sheet metal and comprises a bottom plate 25, arcuate flanges 26, and a plurality of bifurcated arms 27, the bifurcated arms 27 being made integral with the bottom plate 25 and the arcuate flanges 26. The bifurcations of each arm 27 are adapted to receive one end of the braces 18 between them so that the brace may be pivotally secured to the cap by the aforementioned pin 20 which passes through the bifurcations and the brace. The cap may be stamped from comparatively thin sheet metal as the bifurcated arms form continuations of the arcuate flanges and the bottom plate of the cap. It is obvious that the form of the cap lends it strength and rigidity.

From the above descriptions of the more important features of my invention, it will be clear that I have provided a tripod which is of inexpensive construction and is possessed of the desirable attributes of strength and rigidity, the one-piece construction of each leg when coupled with the convex supporting surface formed upon its foot being a distinct improvement upon the like parts of tripods manufactured heretofore. And to this improvement in the art is added improved means for securely pivoting the legs to the body of the tripod.

I claim:

A collapsible tripod comprising a tubular socket member, and a cap secured to the lower end of the socket member, said cap being formed from sheet metal and comprising a bottom plate, arcuate flanges and a plurality of bifurcated arms projecting from the flanges.

FRANK J. PETRICK.